Sept. 18, 1962  F. K. H. NALLINGER  3,054,624
EQUALIZATION SPRING SYSTEM FOR MOTOR VEHICLES
Original Filed July 27, 1956
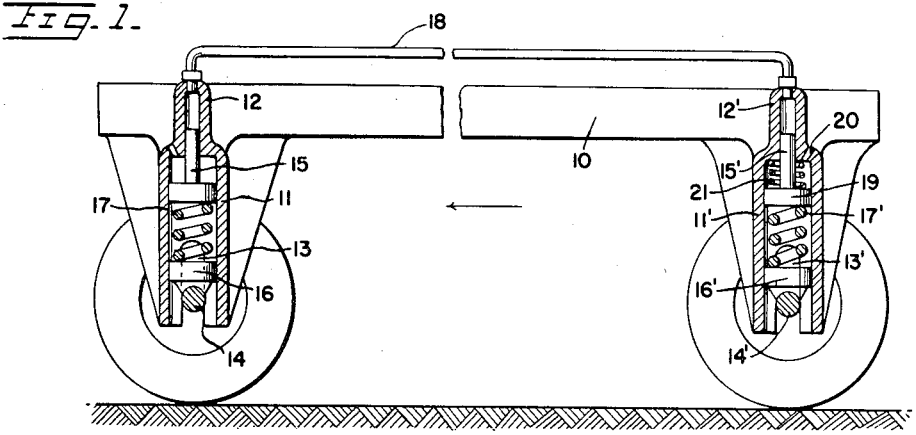
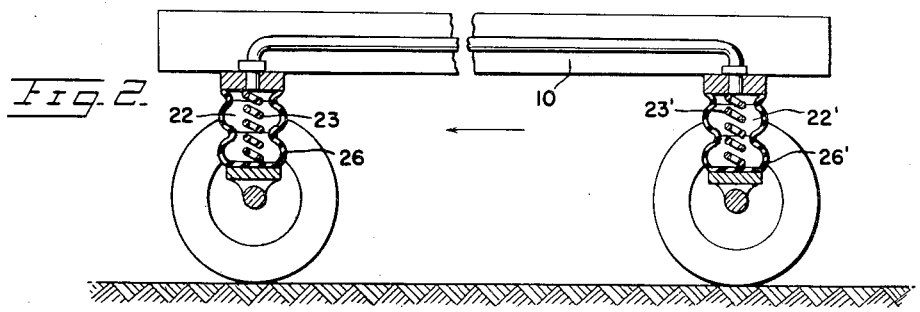
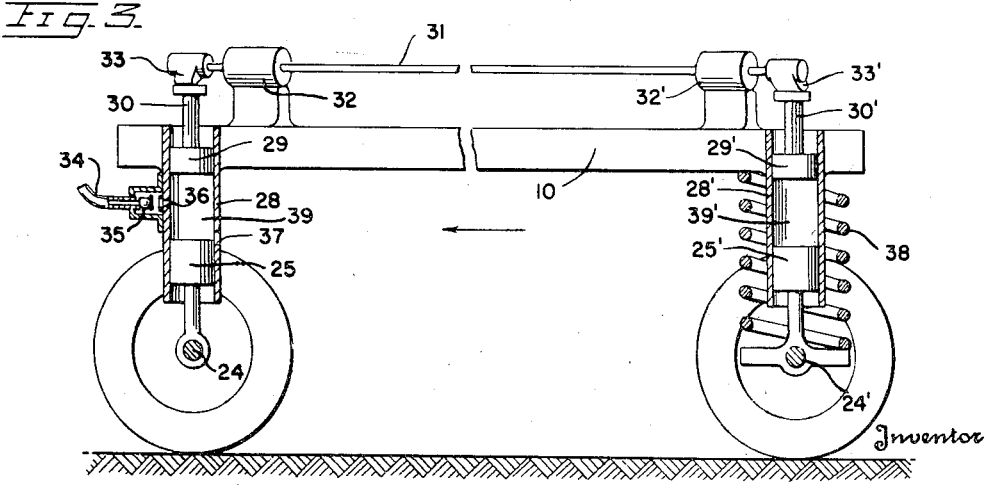
Inventor
FRIEDRICH K.H. NALLINGER
By Dicke, Craig & Freudenberg
Attorneys

United States Patent Office 3,054,624
Patented Sept. 18, 1962

3,054,624
EQUALIZATION SPRING SYSTEM FOR MOTOR
VEHICLES
Friedrich K. H. Nallinger, Stuttgart, Germany, assignor to
Daimler-Benz Aktiengesellschaft, Stuttgart-Unterturk-
heim, Germany
Original application July 27, 1956, Ser. No. 600,557, now
Patent No. 2,917,318, dated Dec. 15, 1959. Divided
and this application Sept. 22, 1959, Ser. No. 842,546
5 Claims. (Cl. 280—104)

The present invention relates to an equalization spring system for vehicles, particularly for motor vehicles having individual wheel suspension, and consists essentially in that in the spring and equalization system between associated wheels, which are effectively interconnected with each other by this system, a pneumatic medium is utilized at least in part.

The present application is a divisional application of the copending application Serial No. 600,557 filed on July 27, 1956 and now Patent No. 2,917,318.

Accordingly, it is an object of the present invention to provide an equalization spring system for the wheels of vehicles, particularly of motor vehicles with individual spring suspensions which are of light weight and which permit favorable spatial arrangements within the vehicle.

Another object of the present invention resides in the provision of such an equalization spring system in vehicles which utilizes a relatively small mass in the system thereof.

It is another object of the present invention to provide an equalization spring system for motor vehicles having individual spring suspension which avoids an inclination of the vehicle frame or body due to obstructions encountered by the vehicle during driving, i.e., which eliminates so-called nodding movements of the vehicle and which also effectively reduces the vertical path of that part of the vehicle body or frame which is disposed near the vehicle axis which is urged in the vertical direction during driving over an obstruction or unevenness in the road.

It is still another object of the present invention to provide a spring system for motor vehicles which offers relatively stiff spring characteristics to the static loads and to the centrifugal forces produced while traversing a curve, which, however, offers relatively soft spring characteristics while passing over obstacles on the road.

Still another object of the present invention resides in the provision of such a balancing spring system for individual spring suspensions of vehicle wheels which afford a maximum of safety and security in the operation by utilizing an auxiliary mechanical spring system.

A still further object of the present invention is the provision of an equalization spring system for vehicles which is of simple construction and which permits the attainment of favorable spring characteristics which may be so selected and matched as to suit the particular needs of the vehicle.

Still another object of the present invention consists in the provision of an auxiliary spring system for equalizing associated vehicle wheels which is so arranged and constructed as to be effectively in series with the individual wheel suspensions which themselves may be constituted either by a mechanical spring suspension or by a hydraulic spring suspension.

Another object of the present invention lies in the provision of such an equalization spring system for vehicles which takes into consideration the tendency of rotation of the frame about a cross axis and which tends to minimize such a rotation by the provision of appropriate vertical rectilinear guide means.

The use of a pneumatic medium in the spring and equalization system which extends from one wheel to another wheel connected therewith, offers in particular the advantage that the pneumatic medium is very light. In that manner, the unavoidable additional weight required with an equalization spring system for the connection of two wheels is reduced to a minimum as compared to the usual spring systems.

A further significant advantage of an equalization spring system utilizing a pneumatic medium lies in the fact that the mass which must be set into motion for purposes of equalization is considerably smaller than with the use of mechanical or hydraulic spring or equalization means.

In particular, the spring and equalization system may consist of mechanical individual spring systems or suspensions and a pneumatic equalization arrangement. In such a construction only one conduit or line must be provided between the individual spring suspensions so that hardly any difficulties are encountered with the spatial disposition of the equalization system as the lines or conduits may be adapted suitably to the available spatial conditions. A favorable and simple construction of such an equalization spring system results in the case when a piston is associated with each of the wheels which are interconnected by the equalization spring system whereby one end of each piston operates against the pneumatic medium establishing the equalization while the other end of each piston, which preferably is enlarged in the manner of a stepped or differential piston, is connected with the respective wheel by the interposition of suitable springs.

In the constructive embodiment of the present invention and simultaneously for reasons of the necessary stabilization of the vehicle frame or superstructure with respect to rotations about a horizontal cross axis as required in every equalization spring system, the present invention further contemplates that the wider or enlarged part of the piston is slidably guided in a preferably vertical guiding cylinder, whereby the supporting spring of the wheel which is formed, for example, as coil spring abuts against the wider end of the piston, and a further helical spring may be provided intermediate the end of the guiding cylinder which is located adjacent the pneumatic cylinder and the collar of the piston at the place of transition between the smaller and larger piston diameters which serves for purposes of stabilizing the equalization spring system.

According to a further important characteristic of the present invention a spring and balancing system is proposed which consists of pneumatic individual spring suspensions and a pneumatic equalization system. Such a system represents a particularly appropriate realization of the main inventive concept in that the aforementioned advantages of the light weight and small mass of the pneumatic medium as well as the favorable adaptation to the constructive and spatial conditions may be realized thereby in a high degree. In particular, a simple construction and arrangement may be obtained if the pneumatic individual spring suspensions and the pneumatic equalization system represent a single interconnected pneumatic system.

In detail, the present invention contemplates a pneumatic cushion coordinated to each of the wheels which are interconnected by the equalization spring system, the interior space of each cushion being connected with that of the other pneumatic cushion by means of a line, while at least between one of the wheels and the vehicle frame an additional, preferably mechanical, spring or spring system is provided. These additional springs lend to the system, on the one hand, the necessary stabilization and, on the other, operate as emergency springs against which the vehicle may support itself in case the pneumatic arrangement should ever become inoperative or fail or in those cases in which during standstill of the engine and therewith also during standstill of the compressor for the pneumatic medium, the pneumatic cushions are slowly emptied of pneumatic medium due to leaks in the system. These additional springs may be arranged within the cylinders, bellows or the like which serve as pneumatic cushions so as to obtain a further saving in space.

Another embodiment of the main inventive concept which incorporates a further important characteristic of the present invention provides a spring and equalization system which consists of pneumatic individual wheel suspensions and of a mechanical equalization mechanism. The constructive arrangement thereof may be made in such a manner that a piston, which moves in a pressure cylinder against the effect of an air cushion to maintain a center position which is as independent as possible of the static load pressure, controls within the region of this center position the pressurized air or pneumatic medium which itself is continuously supplied to replenish the air cushion and flows off again and the maximum pressure of which is chosen at least as high as the maximum occurring load pressure, in such a manner that the pressure of the air cushion is increased with an increase in the load pressure and decreased with a decrease in the load pressure respectively until the piston reaches again essentially the center position thereof.

In this manner the equalization spring system according to the present invention is advantageously combined with a regulating system which maintains the frame at the same height with respect to the road bed at all times regardless of changes in the load.

In particular, it is further proposed in connection therewith that the mechanical equalization system consists of a torsion rod, well known as such in the art, which extends essentially in the longitudinal direction of the vehicle, and which is connected by means of two arms arranged at both ends thereof and extending into opposite directions with a piston each which is loaded by the pneumatic pressure of the corresponding individual spring suspension. Such an equalization spring suspension also requires relatively little space even with the mechanical parts thereof. Furthermore, such an arrangement provides a favorable and simple construction if an essentially vertical guide cylinder is coordinated to each of the wheels which are interconnected by the equalization spring system in which two pistons are slidably guided which enclose therebetween the cushion of the pneumatic spring system and which are connected with the wheel and with the mechanical equalization arrangement respectively.

Further objects, features and advantages of the present invention will become more obvious from the following description when taken in connection with the accompanying drawing, which shows, for purposes of illustration only, several preferred embodiments in accordance with the present invention, and wherein:

FIGURE 1 is a view partially in cross section of an equalization spring system according to the present invention with mechanical individual spring suspensions and a pneumatic equalization spring system connected therebetween.

FIGURE 2 is a view partially in cross section of an equalization spring system in accordance with the present invention which is completely pneumatic and, FIGURE 3 is a view partially in cross of an equalization spring system with pneumatic individual spring suspensions and a mechanical equalization system.

In addition to those advantages mentioned hereinabove which are derived by the present invention, the additional advantage that not only individual spring suspensions are provided but that the equalization as such represents a further spring is also attributable to the particular embodiments as well as to any others which are constructed in accordance with the present invention. In this manner, two or three springs or spring systems are connected one behind the other, i.e., in series with one another whereby a particularly good matching may be attained by the combination of the particular characteristics of the individual springs.

Referring now more particularly to the drawing wherein like reference numerals are used throughout the various views to designate like parts, and more particularly to FIGURE 1, reference numeral 10 designates the frame of a vehicle which is shown essentially schematically in the drawing. The frame is provided with vertical guide cylinders 11 and 11' as well as with essentially vertical pneumatic cylinders 12 and 12' which may be formed integral with the former and may be secured to the frame 10 in any suitable manner. The wheel axles 14 and 14' may move or slide in recesses or channels 13 and 13' of the cylinders 11 and 11' respectively. Pistons 15 and 15' each of which is formed in a step-like manner, i.e., is provided with two portions of different diametric dimensions, slide with the cylinders 11 and 11' and 12 or 12', respectively. Further pistons 16 and 16' move additionally within the cylinders 11 and 11', the pistons 16 and 16' being connected in any suitable manner with the respective wheel axles 14 and 14'. The helical coil springs 17 and 17' are arranged between the piston 15 and 15' and the pistons 16 and 16' respectively so that coil springs 17 and 17' normally tend to oppose movement of pistons 15 and 16 or 15' and 16' toward each other. The pneumatic cylinders 12 and 12' are connected with one another over the equalization line 18. At least one further spring 21 is provided in one wheel suspension between the collar-like enlargement 19 of the piston 15' and the internal cross wall 20 of the cylinder 11'.

During spring movement of the half axle 14, i.e., when the wheel associated with the half axle 14 encounters an obstruction on the road, the spring 17 is compressed and the piston 15 is displaced upwardly. The pneumatic medium is displaced by the cylinder 12 through the line 18 into the cylinder 12'. The piston 15' therefore moves in a downward direction, thereby compressing the spring 17' and therewith attempts to move the axe 14' downwardly. However in view of the fact that the half axle 14' cannot move downwardly, the practical effect is that the frame 10 adjacent cylinders 11', 12' is lifted with respect to the road bed.

The spring 21 assures that the system is always returned to the state of equilibrium or normal operating condition in which the frame 10 lies essentially parallel to the road bed.

An equalization system such as described hereinabove offers the following operational advantages.

If the vehicle is loaded statically by reason of the weight of passengers or if forces are equally applied to the wheels of one side of the vehicle due to the centrifugal forces occurring while traversing a curve which tend to rotate the vehicle body about a longitudinal axis, then both springs 17 and 17' act in parallel. If the vehicle body is lowered by a predetermined distance, either due to changes in the static load or due to centrifugal forces of corresponding magnitude then a total force equal to twice the force necessary to compress each spring by such a distance is exhibited by the entire spring and equalization system in accordance with the present invention.

On the other hand, if the springs of the front and rear wheels operate in series, i.e., if a force is applied to wheel 14 by a road obstruction which would normally compress the spring 17 by a predetermined distance, then each spring would only be compressed one half this predetermined distance, and, consequently, each spring would only offer a force equal to one half that normally produced by the obstruction in a wheel suspension without an equalization system. Consequently, the spring system in that case is only half as stiff as in the case of static loads, and these characteristics render the equalization system very desirable. For it is desirable to provide a relatively stiff spring system for static loads in order to minimize the spring path or stroke during static loading of the vehicle and to maintain sufficient road clearance. Moreover, while traversing curves, the inclination of the vehicle due to centrifugal forces should also be kept relatively small. However, in contrast thereto, a relatively soft spring system is very desirable insofar as passing over unevenness or road obstruction is concerned, especially with respect to the comfort of the driver and passengers.

Consequently, the system described hereinabove is particularly appropriate and suitable to produce the desired characteristics of a motor vehicle spring system, not only to absorb static loads and counteract centrifugal forces in a relatively stiff manner but also to absorb relatively softly the dynamic road shocks which are encountered at the wheels or axles during operation of the vehicle.

The spring 21 serves the purpose of returning the vehicle frame 10 to the horizontal position at all times, i.e., to the position thereof essentially parallel to the road bed.

In FIGURE 2 the springs 17 and 17' of FIGURE 1 are replaced by pneumatic springs 22 and 22' whereas the function of the stabilizing spring 21 of FIGURE 1 is taken over by the springs 23 and 23'. Even though from a theoretical point of view for purposes of stabilization only a single spring 23 would suffice the embodiment according to FIGURE 2 nevertheless provides two springs 23 and 23' so that the frame may support itself by means of springs 23 and 23' in case of failure of the pneumatic system or as a result of discharge of the pneumatic medium from the pneumatic system during lengthy standstill of the engine or compressor normally supplying the pneumatic medium.

The bellows 26 and 26' which enclose the air cushions constituting the pneumatic springs 22 and 22' may appropriately be made of any suitable material, such as plastic, fabric, etc. The springs 23 and 23' are chosen so as to be relatively weak.

The operation of the system disclosed in FIGURE 2 is exactly the same as that shown in FIGURE 1.

In the arrangement according to FIGURE 3, a piston 25 is connected with the axle 24 and a piston 25' with the axle 24'. The pistons 25 and 25' slide in cylinders 28 and 28' respectively which are rigidly secured to the frame 10. Further pistons 29 and 29' which also slide in these cylinders 28 and 28' and are connected to transmission rods 30 and 30' respectively. A torsion rod 31 which is freely rotatably supported in bearing brackets 32 and 32' rigidly secured to frame 10 and which, in the drawing, is shown as slanting slightly with respect to the direction of movement of the vehicle from the left front toward the right rear, carries at both ends thereof levers 33 and 33' which are secured to the torsion rod 31, for example, by means of a splined arrangement and which extend into opposite direction. The levers 33 and 33' abut with the outer free ends thereof against the transmission rods 30 and 30'. A pressure air line 34 which is closed by a spring-loaded return valve 35 of the ball type is in communication with the interior cylinder space 39 formed by cylinder 28 by means of the aperture 36. An aperture 37 connects the interior space 39 with the atmosphere. A stabilizing spring 38 is arranged between the axle 24' and the frame 10.

Aside from the inlet and discharge system for the pressurized pneumatic medium formed by parts 34 to 37, the equalization system of this figure operates in a manner analogous to that of FIGURES 1 and 2. If the half axle 24 rises, then the air between the pistons 25 and 29 is compressed, transmission rod 30 moves the lever 33 upwardly, and the lever 33', due to the torsional twisting of the torsion rod 31, moves downwardly and thereby forces the piston 29 and therewith also the piston 25' downwardly whereby it also tends to move the axle 24' downwardly. Exactly as described hereinabove in connection with the other embodiments, this will result in a lifting of the frame at that particular place.

In order that the frame 10 maintain the same height with respect to the road bed with different static loads, highly compressed air is conducted into the space 39 formed between the pistons 25 and 29 through the line 34, valve 35 and aperture 36. This air may escape through the aperture 37 under certain conditions. The upper edge of the piston 25 thereby always closes automatically the aperture 37 to such an extent that the pressure necessary for equalization of the load is maintained in the cylinder space 39. Possibly a similar supply and discharge system for a pressurized pneumatic medium may also be provided in connection with cylinder 28'.

Furthermore, the application of such a pressure-air supply and discharge system may also be of advantage in connection with the fully pneumatic spring and equalization system such as illustrated in FIGURE 2.

The equalization spring systems described hereinabove relate to the front and rear wheel located on one side of the vehicle. However, it is understood that depending on the individual requirements of the spring systems such equalization spring systems may also be provided between the right front wheel and the left rear wheel and correspondingly between the left front wheel and the right rear wheel, as well as also between the right front wheel and the left front wheel or between the right rear wheel and the left rear wheel. Moreover, any combinations of the aforementioned equalization arrangements are also possible.

While I have described and shown several embodiments in accordance with the present invention, it is understood that the same is not limited thereto but is susceptible of many modifications and changes within the spirit of the present invention, and I intend to cover such changes and modifications except as defined by the appended claims.

I claim:

1. An equalization spring system for vehicles having a frame, especially motor vehicles with individual spring suspensions comprising a plurality of wheels supported on axles, spring means so constructed and arranged as to normally individually spring support each of said two wheels independently with respect to the frame, equalization means including spring means interconnecting said first-mentioned spring means to provide spring equalization between said wheels, said first-mentioned spring means including individual mechanical springs, said second-mentioned spring means being formed by a pneumatic equalization arrangement including a cylinder, a first piston means within said cylinder associated with each of the wheels connected by said equalization means, and a second piston means within said cylinder connected to the respective axle of said wheels, said individual mechanical springs being disposed between said pistons.

2. An equalization spring system for vehicles having a frame, especially motor vehicles with individual spring suspensions comprising a plurality of wheels supported on axles, spring means so constructed and arranged as to normally individually spring support each of said two wheels independently with respect to the frame, equalization means including spring means interconnecting said first-mentioned means to provide spring equalization between said wheels, said first-mentioned spring means including individual mechanical springs, said second-mentioned spring means being formed by a pneumatic equalization arrangement including a cylinder, a first piston within said cylinder associated with each of the wheels connected by said equalization means, and a second piston within said cylinder connected to the respective axle of said wheels, said individual mechanical springs being disposed between said pistons, and further mechanical spring means within said cylinder between at least one of said wheels and said frame to return said frame to the normal position thereof at all times.

3. An equalization spring system for motor vehicles having a frame, especially motor vehicles with individual spring suspensions comprising a plurality of wheels, spring means so constructed and arranged as to normally individually spring support each of said two wheels independently with respect to the frame, equalization means including spring means interconnecting said first-mentioned spring means to provide spring equalization between said wheels, said first-mentioned spring means including individual mechanical springs, said second-mentioned spring means being formed by a pneumatic equalization arrangement and including piston means associated with each of the wheels connected by said equalization means, said piston means being formed in a stepped manner to provide portions of unequal diametric dimensions, said second-mentioned spring means further comprising cylinder means secured to the vehicle frame for each of said piston means including an essentially vertical guide cylinder portion for the smaller portion of each piston means and for displacing the pneumatic fluid in said equalization system.

4. A spring equalization system for vehicles having a vehicle frame and a plurality of wheels supported on axles, comprising spring means for individually spring suspending at least two of said wheels on the vehicle frame, and pneumatic equalization spring means connected between said first-mentioned spring means to provide equalization of the spring movements of said two wheels, said first-mentioned and said equalization spring means effectively including three springs operatively connected in series with each other, one spring each forming part of each one of said first-mentioned spring means and the other one of said three springs interconnecting the two springs, said equalization spring means including a piston associated with each of the wheels connected by said equalization means, each piston being formed in a stepped manner to provide portions of unequal diametric dimensions, cylinder means secured to the vehicle frame for each of the pistons including an essentially vertical guide-cylinder portion for the larger piston portion of each piston means, one end of each piston operating against the pneumatic medium producing the equalization and the other end thereof being operatively connected with the respective wheel by said first-mentioned spring means, said first-mentioned spring means including coil springs abutting at one end against the lower end of the respective larger piston portion and with the other end thereof against the respective wheel axle, and a further helical spring for one of said pistons disposed between the end of the respective guide cylinder portion for the small portion of said last-mentioned piston and the upper side of the larger piston portion thereof to stabilize the equalization spring system and provide for return of said frame to the normal position thereof at all times.

5. An equalization spring system for vehicles having a frame, especially motor vehicles with individual spring suspensions comprising a plurality of wheels supported on axles, spring means so constructed and arranged as to normally individually spring support each of said two wheels independently with respect to the frame, equalization means including spring means interconnecting said first-mentioned means to provide spring equalization between said wheels, said first-mentioned means including individual mechanical springs, said second-mentioned spring means being formed by a pneumatic equalization arrangement including a first piston associated with each of the wheels connected by said equalization means, and a second piston connected to the respective axle of said wheels, said individual mechanical spring being disposed between said pistons, and further mechanical spring means between at least one of said first pistons and said frame to return said frame to the normal position thereof at all times and stabilize said equalization spring system.

References Cited in the file of this patent

UNITED STATES PATENTS

| | | |
|---|---|---|
| 1,344,334 | Croonholm | June 20, 1920 |
| 1,631,569 | Aldrin | June 7, 1927 |
| 2,650,108 | Bruce | Aug. 25, 1953 |
| 2,917,318 | Nallinger | Dec. 15, 1959 |

FOREIGN PATENTS

| | | |
|---|---|---|
| 326,545 | France | May 29, 1903 |